United States Patent
Manabe et al.

(10) Patent No.: US 6,905,741 B2
(45) Date of Patent: Jun. 14, 2005

(54) HIGH BIREFRINGENCE LIQUID-CRYSTALLINE MEDIUM

(75) Inventors: Atsutaka Manabe, Wilmshausen/Bensheim (DE); Matthias Bremer, Darmstadt (DE); Detlef Pauluth, Ober-Ramstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/414,495

(22) Filed: Apr. 16, 2003

(65) Prior Publication Data

US 2004/0026661 A1 Feb. 12, 2004

(30) Foreign Application Priority Data

Apr. 16, 2002 (DE) .......................................... 102 16 851

(51) Int. Cl.[7] .......................... C09K 19/12; C09K 19/30
(52) U.S. Cl. ............... 428/1.1; 252/299.63; 252/299.66
(58) Field of Search ...................... 428/1.1; 252/299.63, 252/299.66

(56) References Cited

FOREIGN PATENT DOCUMENTS

DE 4301700 * 7/1994

OTHER PUBLICATIONS

CAPLUS 1995: 304996.*
DERWENT Abstract for DE–4301700, 1994–235878.*

* cited by examiner

*Primary Examiner*—Shean C. Wu
(74) *Attorney, Agent, or Firm*—Millen, White, Zelano, Branigan, P.C.

(57) ABSTRACT

A liquid-crystalline medium comprises one or more compounds of the general formula (I)

$$CF_3O\text{-}a\text{-}b\text{-}c\text{-}F \qquad (I)$$

in which a, b, c may each denote, independently of one another,

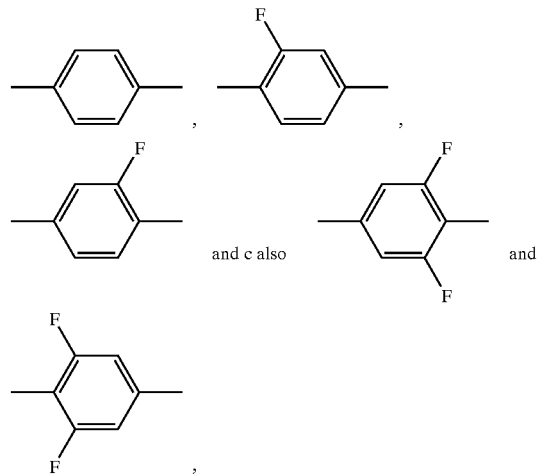

and c also and further liquid-crystalline compounds.

27 Claims, No Drawings

HIGH BIREFRINGENCE LIQUID-CRYSTALLINE MEDIUM

The present invention relates to a liquid-crystalline medium, and to electro-optical displays containing this medium.

Liquid crystals are used, in particular, as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (super birefringence effect) cells and OMI (optical mode interference) cells. The most common display devices are based on the Schadt-Helfrich effect and have a twisted nematic structure.

The liquid-crystal materials must generally have good chemical and thermal stability and good stability to electric fields and electromagnetic radiation. Furthermore, the liquid-crystal materials should low viscosity and give short response times, low threshold voltages and high contrast in the cells.

They should furthermore have a suitable mesophase, for example a nematic mesophase for the abovementioned cells, at conventional operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, must satisfy various requirements depending on the cell type and area of application. For example, materials for cells having a twisted nematic structure should have positive dielectric anisotropy and low electrical conductivity.

For example, liquid-crystalline media having large positive dielectric anisotropy, broad nematic phases, relatively low birefringence, very high resistivity, good light and temperature stability and low vapour pressure are desired for matrix liquid-crystal displays containing integrated non-linear elements for switching individual pixels (MLC displays).

Matrix liquid-crystal displays of this type are known. Non-linear elements which can be used for individual switching of the individual pixels are, besides passive elements such as varistors or diodes, active elements such as transistors. This case is then referred to as an "active matrix".

In the promising TFT (thin film transistor) displays, the electro-optical effect utilized is usually the TN effect. A distinction is made between TFTs comprising compound semiconductors, for example CdSe, or TFTs based on poly-crystalline or amorphous silicon.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be expanded to fully colour-compatible displays, in which a mosaic of red, green and blue filters is arranged in such a way that each filter element is located opposite a switchable pixel. The TFT displays usually operate as TN cells with crossed polarizers in transmission and are backlit.

MLC displays of this type are used as displays in notebook computers, for televisions (pocket TVs) or in automobile or aircraft construction. Besides problems regarding the angle dependence of the contrast and the response times, difficulties also arise in these MLC displays due to inadequate resistivity of the liquid-crystal mixtures. With decreasing resistance, the contrast of an MLC display drops, and the problem of "image sticking" can occur. Since the resistivity of the liquid-crystal mixture generally drops over the life of an MLC display owing to interaction with the interior surfaces of the display, a high (initial) resistance is very important in order to obtain acceptable service lives. In particular in the case of mixtures having a low threshold voltage, it was hitherto impossible to achieve very high resistivities, since liquid-crystalline materials having a high positive dielectric anisotropy $\Delta\in$ in general also have a relatively high electrical conductivity. It is furthermore important that the resistivity increases as little as possible with increasing temperature and after heat and/or light exposure. To achieve short display response times, the mixtures must furthermore have a small rotational viscosity. To be able to use the displays even at low temperatures, for example for outdoor, automobile or avionics applications, it is required that crystallization and/or smectic phases do not occur even at low temperatures, and that the temperature dependence of the viscosity is as low as possible.

Liquid-crystal mixtures having a favourable profile of properties are also required in the recent development of liquid crystal on silicon (LCoS) projection displays. Owing to the small pixel size in the region of 20 $\mu$m, the high resolution and the desired short response times of the displays, low layer thicknesses are required. To achieve these thicknesses, liquid-crystal mixtures having a comparatively high optical birefringence $\Delta$n are required. High birefringence liquid-crystalline compounds often exhibit an intrinsic smectic phase or induce the formation of a smectic phase in admixture with other liquid-crystalline compounds which has an adverse effect on the low-temperature stability of the displays.

There is therefore a great need for liquid-crystalline media which have the following properties:

high birefringence $\Delta$n for small layer thicknesses of the displays;

high positive dielectric anisotropy $\Delta\in$ for a low threshold voltage $V_{th}$;

low rotational viscosity $\gamma_1$ for short response times;

high resistance to light radiation for a long life of the displays;

expanded nematic phase range, in particular down to low temperatures, and low temperature dependence of the viscosity for use of the displays even at low temperatures.

It is an object of the invention to provide liquid-crystalline media for IPS, MLC, TN or STN displays, but especially for LCoS displays, which have very high resistivities, low threshold voltages, short response times and high birefringence values $\Delta$n while maintaining the other boundary conditions.

The object is achieved by a liquid-crystalline medium comprising a) from 3 to 50% by weight of one or more compounds of the general formula (I)

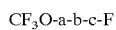  (I)

in which a, b, c may each denote, independently of one another,

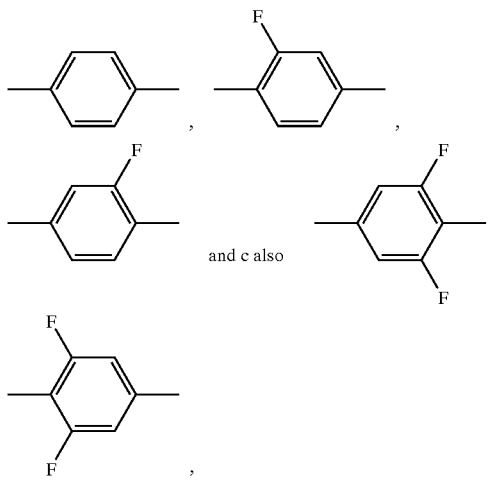

b) from 10 to 90% by weight of one or more compounds of the general formulae (II) to (V)

R-d-e-Z-f-X    (II)

in which d, e, f, may each denote, independently of one another,

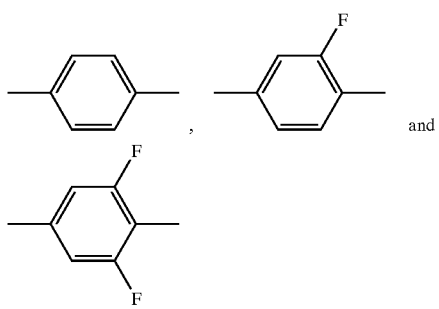

R may denote an alkyl, alkoxy or alkenyl radical having 1 to 15 carbon atoms or 2 to 15 carbon atoms, respectively, where one or more —CH$_2$— groups may be replaced by —O— in such a way that oxygen atoms are not adjacent, X may denote —F, —OCF$_3$, —OCF$_2$H, —Cl and —CF$_3$, and Z may denote a single bond and —CH$_2$—CH$_2$—, R-g-h-i-X    (III)

in which g may denote

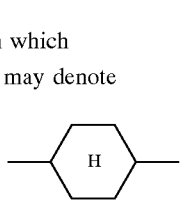

h may denote

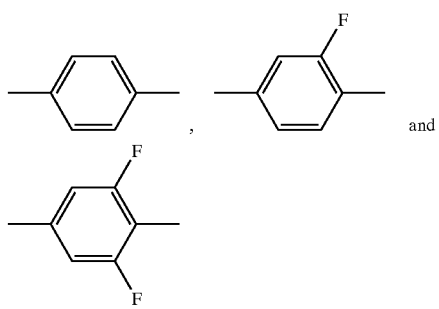

i may denote

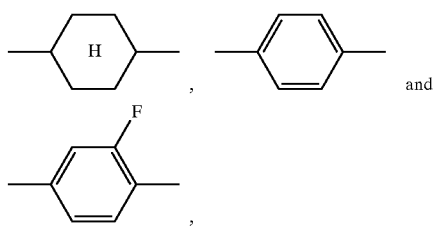

and X and R are as defined above,

R-h-i-X    (IV)

in which h, i, R and X are as defined above,

R-k-l-m-n-X    (V)

in which k may denote

l may denote

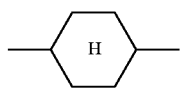

m, n may denote

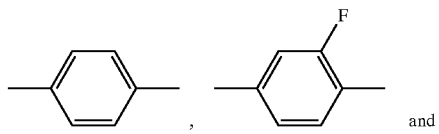

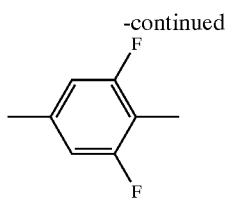

and R and X are as defined above, c) from 0 to 30% by weight of one or more compounds of the general formula (VI)

R-p-q-r-R¹      (VI)

in which p may denote

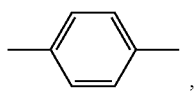

q, r may each denote, independently of one another,

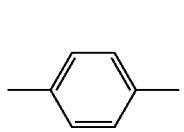 and 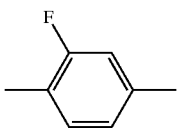,

R is as defined above, and

R¹ may denote, in addition to the meanings of R, —F and —Cl, d) from 0 to 30% by weight of one or more compounds of the general formula (VII)

R-s-t-u-v-R      (VII)

in which s may denote

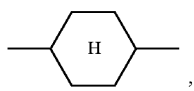

t, u may denote

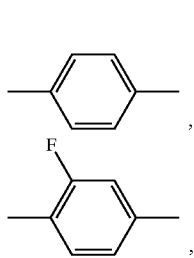

v may denote

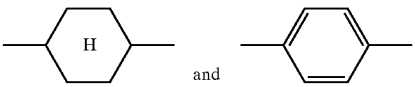

and

R are independent of one another and are as defined above, e) from 0 to 30% by weight of one or more compounds of the general formulae (VIII) and/or (IX)

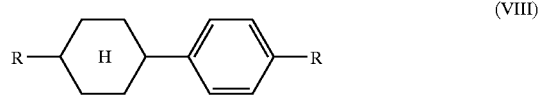      (VIII)

in which

R are independent of one another and are as defined above,

R-w-x-y-R²      (IX)

in which w, x may denote

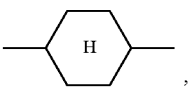, y may denote

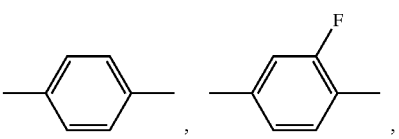,

R is as defined above, and

R² may denote, in addition to the meanings of R, —F, the sum of the components a) to e) being 100% by Weight.

In the formulae (II) to (IX), R can be a straight-chain or branched alkyl and/or alkoxy radical having 1 to 15 carbon atoms. It is preferably straight-chain, has 1, 2, 3, 4, 5, 6 or 7 carbon atoms and accordingly is preferably methyl, ethyl, propyl, butyl, pentyl, hexyl, heptyl, methoxy, ethoxy, propoxy, butoxy, pentoxy, hexoxy or heptoxy, furthermore octyl, nonyl, decyl, undecyl, dodecyl, tridecyl, tetradecyl, pentadecyl, octoxy, nonoxy, decoxy, undecoxy; dodecoxy, tridecoxy, tetradecoxy or pentadecoxy.

R can be oxaalkyl, preferably straight-chain 2-oxapropyl (=methoxymethyl), 2-(=ethoxymethyl) or 3-oxabutyl (=methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxabutyl, 2-, 3-, 4-, 5-, 6-, 7- or 8-oxanonyl, or 2-, 3-, 4-, 5-, 6-, 7-, 8- or 9-oxadecyl.

R can be a straight-chain or branched alkenyl radical having 2 to 15 carbon atoms. It is preferably straight-chain and has 2 to 7 carbon atoms. Accordingly, it is in particular vinyl, prop-1- or prop-2-enyl, but-1-, -2- or but-3-enyl, pent-1-, -2-, -3- or pent-4-enyl, hex-1-, -2-, -3-, -4- or hex-5-enyl, hept-1, -2-, -3-, -4-, -5- or hept-6-enyl.

R can be an alkyl radical having 1 to 15 carbon atoms in which one CH₂ group has been replaced by —O— and one has been replaced by —CO—, these preferably being adjacent. This radical thus contains an acyloxy group —CO—O— or an oxycarbonyl group —O—CO—. It is preferably straight-chain and has 2 to 6 carbon atoms. Accordingly, it is particularly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonyl-methyl, ethoxycarbonylmethyl, propoxycarbonylmethyl, butoxycarbonyl-methyl, 2-(methoxycarbonyl)ethyl, 2-(ethoxycarbonyl)ethyl, 2-(propoxy-carbonyl)ethyl, 3-(methoxycarbonyl)propyl, 3-(ethoxycarbonyl)propyl or 4-(methoxycarbonyl)butyl.

Preferred compounds of the general formula (I) are the following compounds of the formulae (Ia) to (Ih):

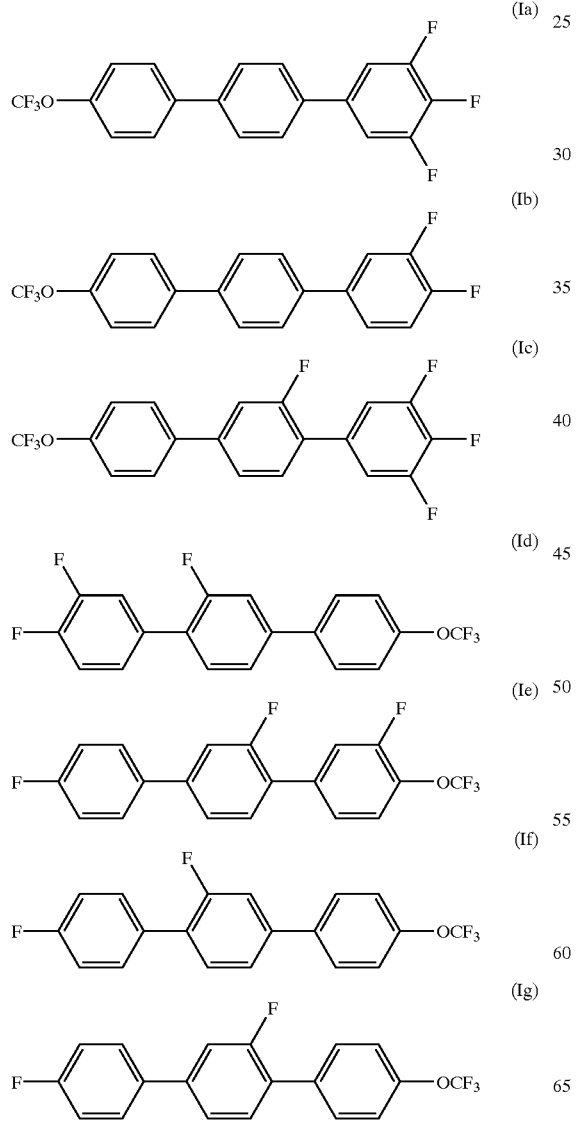

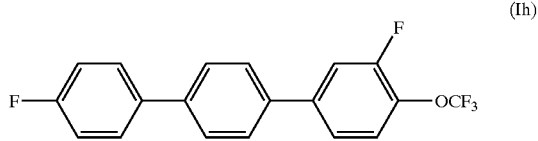

Preferred compounds of the general formula (II) are the following compounds of the formulae (IIa) to (IIg):

| | |
|---|---|
| R-P-G-U-X | (IIa) |
| R-P-G-G-X | (IIb) |
| R-G-G-G-X | (IIc) |
| R-G-G-U-X | (IId) |
| R-G-G-P-X | (IIe) |
| R-G-P-G-X | (IIf) |
| R-G-P-E-P-X | (IIg) | in which

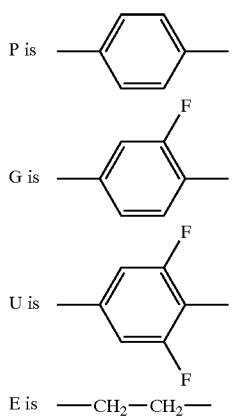

E is —CH$_2$—CH$_2$— and R and X are as defined above.

Preferred compounds of the general formulae (III) to (V) are the following compounds of the formulae (IIIa) to (IIIf), (IVa) to (IVf) and (Va) to (Vd):

| | |
|---|---|
| R-C-P-G-X | (IIIa) |
| R-C-P-U-X | (IIIb) |
| R-C-C-G-X | (IIIc) |
| R-C-C-U-X | (IIId) |
| R-C-G-U-X | (IIIe) |
| R-C-G-G-X | (IIIf) |
| R-G-U-X | (IVa) |
| R-G-G-X | (IVb) |
| R-P-U-X | (IVc) |
| R-C-P-X | (IVd) |
| R-C-G-X | (IVe) |
| R-C-U-X | (IVf) |
| R-C-C-P-U-X | (Va) |

R-C-P-G-U-X (Vb)

R-C-P-G-G-X (Vc)

R-C-C-G-U-X (Vd)

in which

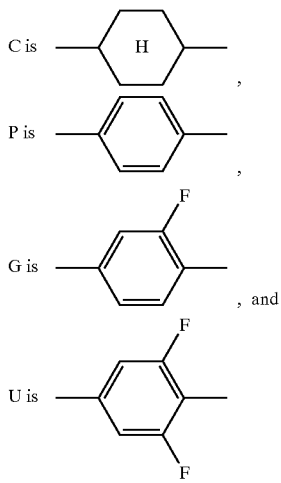

C is , P is , G is , and U is and R and X are as defined above.

Particular preference is given to those compounds of the general formulae (II) to (V) in which R is an alkyl radical havig 1 to 7 carbon atoms X=F.

Preferred compounds of the general formulae (VI) and (VII) are the following compounds of the general formulae (VIa) to (VIc) and (VIIa) to (VIIf):

R-P-GI-GI-F (VIa)

R-P-GI-GI-Cl (VIb)

R-P-G-P-R (VIc)

R-C-P-P-C-R (VIIa)

R-C-G-P-C-R (VIIb)

R-C-P-G-P-R (VIIc)

R-C-P-GI-P-R (VIId)

R-C-G-P-P-R (VIIe)

R-C-GI-P-P-R (VIIf)

in which
R are at each occurrence independent of one another and as defined above,

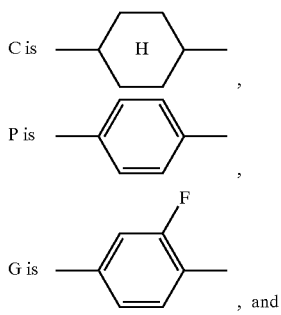

C is , P is , G is , and

-continued

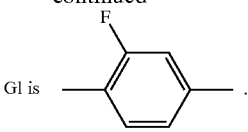

GI is

Preference is given to those compounds of the general formulae (VI) and (VII) in which R is an alkyl radical having 1 to 7 carbon atoms.

Hereinbelow, the compounds of the general formulae (I) to (IX) are represented by acronyms.

"C", "P", "G", "GI", "U" and "E" are as defined above. Furthermore,

| "n"   | R, $R^1$ or $R^2$ = | —$C_nH_{2n+1}$ |
|-------|---------------------|----------------|
| "V"   | R, $R^1$ or $R^2$ = | —CH=CH$_2$ |
| "Vl"  | R, $R^1$ or $R^2$ = | —CH=CH—$C_lH_{2l+1}$ |
| "kVl" | R, $R^1$ or $R^2$ = | —$C_kH_{2k}$—CH=CH—$C_lH_{2l+1}$ |
| "lVk" | R, $R^1$ or $R^2$ = | $C_lH_{2l+1}$—CH=CH—$C_kH_{2k}$— |
| "On"  | R, $R^1$ or $R^2$ = | —$OC_nH_{2n+1}$ |
| "nO"  | R, $R^1$ or $R^2$ = | $C_nH_{2n+1}O$— |
| "F"   | X, $R^1$ or $R^2$ = | —F |
| "Cl"  | X or $R^1$ =        | —Cl |
| "OT"  | X, $R^1$ or $R^2$ = | —$OCF_3$ |
| "TO"  | X, $R^1$ or $R^2$ = | $F_3CO$— |
| "T"   | X, $R^1$ or $R^2$ = | —$CF_3$ |

The substituent on the left of the structural formula is given first followed by the substituent on the right, separated by a hyphen.

For example, the compounds of the formula (Ia) to (Ih) are abbreviated as follows: PPU-TO-F, PPG-TO-F, PGU-TO-F, GIGIP-F-OT, PGG-F-OT, PGIP-F-OT, PGP-F-OT, PPG-F-OT.

The particularly preferred compounds of the general formulae (IIa) to (IIg) are abbreviated as follows: PGU-n-F, PGG-n-F, GGG-n-F, GGU-n-F, GGP-n-F, GPG-n-F and GPEP-n-F, where n=1 to 7.

Especially preferred compounds of the general formula (II) are PGU-2-F, PGU-3-F and PGU-5-F.

Especially preferred compounds of the general formula (III) are CPG-2-F, CPG-3-F, CPG-5-F, CGU-2-F, CGU-3-F, CGU-5-F-, CPU-2-F, CPU-3-F and CPU-5-F.

An especially preferred compound of the general formula (V) is CCGU-3-F.

An especially preferred compound of the general formula (VI) is PGIGI-3-F.

Especially preferred compounds of the general formula (VIII) are CGPC-3-3, CPPC-3-3, CPPC-5-3, CGPC-5-3, CPPC-5-5 and CGPC-5-5.

Preferred compounds of the general formula (VII) are CP-n-Om where n, m=1 to 7.

Preferred compounds of the general formula (IX) are CCP-n-m, CCG-n-m where n, m=1 to 7, with particular preference being given to CCP-V-1, CCP-V2-1 and CCG-V-F.

Preferred liquid-crystalline media comprise the components a) to e) in the following proportions by weight:
a) from 7 to 25% by weight of one or more compounds of the general formula (I),
b) from 40 to 85% by weight of one or more compounds of the general formulae (II) to (V),
c) from 3 to 15% by weight of one or more compounds of the general formula (VI),
d) from 5 to 20% by weight of one or more compounds of the general formula (VI), e) from 0 to 10% by weight of one or more compounds of the general formulae (VIII) and/or (IX), the sum of the components a) to e) being 100% by weight. In particular, component b) consists of b1) from 20 to 80% by weight of one or more compounds of the general formula (II), and b2) from 80 to 20% by weight of one or more compounds of the general formulae (III) to (V), the sum of the components b1) and b2) being 100% by weight.

The compounds are prepared by methods known per se, as described in the literature (for example in the standard works, such as Houben-Weyl, Methoden der Organischen Chemie, Georg-Thieme-Verlag, Stuftgart), to be precise under reaction conditions which are known and suitable for said reactions. Use can also be made here of variants which are known per se, but are not mentioned here in greater detail. Furthermore, the compounds of the formulae (I) to (IX) can be prepared as described in the relevant patent literature.

The invention also relates to electro-optical displays, in particular STN or MLC displays, having two plane-parallel outer plates, which, together with a frame, form a cell, integrated non-linear elements for switching individual pixels on the outer plates, and a nematic liquid-crystal mixture of positive dielectric anisotropy which is located in the cell, which contain the liquid-crystalline media according to the invention, and to the use of these media for electro-optical displays. In particular, the invention relates to LCOS displays containing the liquid-crystalline media according to the invention.

The liquid-crystal mixtures according to the invention allow a significant extension of the parameter latitude which is available.

The achievable combinations of clearing point, rotational viscosity, optical anisotropy Δn and threshold voltage are superior to current prior art materials.

The requirement for a high birefringence in conjunction with a high clearing point and a broad nematic phase range has hitherto only been achieved inadequately.

While retaining the nernatic phase down to −15° C., preferably down to −20° C., particularly preferably down to −25° C., and clearing points above 80° C., preferably above 90° C., particularly preferably above 95° C., the liquid-crystal mixtures according to the invention simultaneously allow birefrigence values of ≧0.17, preferably ≧0.18, particularly preferably ≧0.185, a low threshold voltage and simultaneously a low rotational viscosity.

The construction of the STN or MLC display according to the invention from polarizers, electrode base plates and surface-treated electrodes corresponds to the conventional construction for displays of this type. The term conventional construction is broadly drawn here and also covers all variations and modifications of the MLC display, in particular including matrix display elements based on poly-Si TFT or MIM and IPS displays.

The liquid-crystal mixtures which can be used in accordance with the invention are prepared in a manner conventional per se. In general, the desired amount of the components used in a lesser amount is dissolved in the component making up the principal constituent, expediently at elevated temperature. It is also possible to mix solutions of the components in an organic solvent, for example in acetone, chloroform or methanol, and to remove the solvent again after thorough mixing, for example by distillation. It is also possible to prepare the mixtures in other conventional manners, for example by using pre-mixtures, for example homologue mixtures, or using "multi-bottle" systems.

The examples which follow illustrate the invention:

EXAMPLES A TO M AND COMPARATIVE EXAMPLE

Liquid-crystal mixtures having the compositions indicated were prepared.

The following measurements were carried out on these mixtures:

temperature of the smectic-nematic phase transition S→N [° C.];

clearing point [° C.];

optical anisotropy Δn at 589 nm and 20° C.;

voltages $V_0$ (Freedericksz transition) [V];

dielectric anisotropy Δε at 1 kHz and 20° C.

The electro-optical data were measured in a TN cell in the 1st minimum (d·Δn=0.5 μm) at 20° C.

Example A

| Component | [% by weight] |
|---|---|
| PGIGI-3-F | 11 |
| CPG-2-F | 8 |
| CPG-3-F | 7 |
| CPG-5-F | 5 |
| CCGU-3-F | 5 |
| CGU-3-F | 4 |
| PGU-2-F | 12 |
| PGU-3-F | 12 |
| PGU-5-F | 12 |
| CGPC-3-3 | 3 |
| CPPC-3-3 | 3 |
| CPPC-5-3 | 3 |
| CPPC-5-5 | 3 |
| PPG-TO-F | 6 |
| PPU-TO-F | 6 |

S → N [° C.]: <−20° C.
Clearing point [° C.]: +100.0° C.
Δn: +0.190
Δε: +11.9
$V_0$ [V]: +1.11

Example B

| Component | [% by weight] |
|---|---|
| PGIGI-3-F | 12 |
| CPG-2-F | 7 |
| CPG-3-F | 5 |
| CPG-5-F | 6 |
| CGU-3-F | 2 |
| PGU-2-F | 12 |
| PGU-3-F | 12 |
| PGU-5-F | 12 |
| CCGU-3-F | 6 |
| CGIPC-3-3 | 2 |
| CPPC-3-3 | 4 |
| CPPC-5-3 | 3 |
| CPPC-5-5 | 2 |
| PPG-TO-F | 7 |
| PPU-TO-F | 8 |

S → N [° C.]: <−20° C.
Clearing point [° C.]: +99.5° C.
Δn: +0.1929
Δε: +11.9
$V_0$ [V]: +1.15

Example C

| Component | [% by weight] |
|---|---|
| PGIGI-3-F | 11 |
| CPG-2-F | 8.5 |
| CCGU-3-F | 6 |
| CGU-3-F | 9 |
| PGU-2-F | 12 |
| PGU-3-F | 12 |
| PGU-5-F | 12 |
| CGPC-3-3 | 2.5 |
| CPPC-3-3 | 4 |
| CPPC-5-3 | 4 |
| CPPC-5-5 | 4 |
| PPG-TO-F | 8 |
| PPU-TO-F | 7 |

S → N [° C.]: <−20° C.
Clearing point [° C.]: +102.5° C.
$\Delta n$: +0.1911
$\Delta \epsilon$: +12.6
$V_0$ [V]: +1.11

Example D

| Component | [% by weight] |
|---|---|
| PGIGI-3-F | 6 |
| CPG-2-F | 9 |
| CPG-3-F | 9 |
| CPG-5-F | 9 |
| CCGU-3-F | 7 |
| PGU-2-F | 10 |
| PGU-3-F | 10 |
| PGU-5-F | 10 |
| CGPC-3-3 | 3 |
| CPPC-3-3 | 3 |
| CPPC-5-3 | 3 |
| CPPC-5-5 | 2 |
| PPG-TO-F | 6 |
| PPU-TO-F | 6 |
| CGU-3-F | 7 |

S → N [° C.]: <−20° C.
Clearing point [° C.]: +101.5° C.
$\Delta n$: +0.1784
$\Delta \epsilon$: +12.2
$V_0$ [V]: +1.09

Example E

| Component | [% by weight] |
|---|---|
| PGIGI-3-F | 6 |
| CPG-2-F | 9 |
| CPG-3-F | 8 |
| CPG-5-F | 8 |
| CCGU-3-F | 6 |
| PGU-2-F | 12 |
| PGU-3-F | 12 |
| PGU-5-F | 11 |
| CGIPC-3-3 | 3 |
| CPPC-3-3 | 3 |
| CPPC-5-3 | 3 |
| CPPC-5-5 | 3 |
| PPG-TO-F | 6 |
| PPU-TO-F | 6 |
| CGU-3-F | 4 |

S → N [° C.]: <−20° C.
Clearing point [° C.]: +99.5° C.
$\Delta n$: +0.1838
$\Delta \epsilon$: +11.6
$V_0$ [V]: +1.09

Example F

| Component | [% by weight] |
|---|---|
| CPG-2-F | 8 |
| CPG-3-F | 6 |
| CPG-5-F | 5 |
| CCGU-3-F | 5 |
| CGU-3-F | 3 |
| PGU-2-F | 12 |
| PGU-3-F | 12 |
| PGU-5-F | 12 |
| CGPC-3-3 | 3 |
| CPPC-3-3 | 4 |
| CPPC-5-3 | 3 |
| CPPC-5-5 | 3 |
| PPG-TO-F | 6 |
| PPU-TO-F | 6 |
| PGIGI-3-F | 6 |
| GIGIP-F-OT | 6 |

S → N [° C.]: <−20° C.
Clearing point [° C.]: +100.0° C.
$\Delta n$: +0.1849
$\Delta \epsilon$: +12.1
$V_0$ [V]: +1.12

Example G

| Component | [% by weight] |
|---|---|
| PGIGI-3-F | 9 |
| CPG-2-F | 9 |
| CPG-3-F | 9 |
| CPG-5-F | 9 |
| CCGU-3-F | 7 |
| CGU-3-F | 5 |
| PGU-2-F | 10 |
| PGU-3-F | 10 |
| PGU-5-F | 10 |
| CGPC-3-3 | 2 |
| CPPC-3-3 | 3 |
| CPPC-5-3 | 3 |
| CPPC-5-5 | 2 |
| PPG-TO-F | 6 |
| PPU-TO-F | 6 |

S → N [° C.]: <−30° C.
Clearing point [° C.]: +100.0° C.
$\Delta n$: +0.1828
$\Delta \epsilon$: +11.8
$V_0$ [V]: +1.12

Example H

| Component | [% by weight] |
|---|---|
| PGIGI-3-F | 7 |
| CPG-2-F | 10 |
| CPG-3-F | 9 |
| CPG-5-F | 10 |
| CCGU-3-F | 7 |
| PGU-2-F | 12 |
| PGU-3-F | 12 |
| PGU-5-F | 12 |
| CPPC-3-3 | 3 |
| CPPC-5-3 | 3 |
| CPPC-5-5 | 3 |
| PPG-TO-F | 6 |
| PPU-TO-F | 6 |

S → N [° C.]: <−30° C.
Clearing point [° C.]: +98.0° C.
$\Delta n$: +0.1851
$\Delta \epsilon$: +12.7
$V_0$ [V]: +1.09

Example I

| Component | [% by weight] |
|---|---|
| PGIGI-3-F | 9 |
| CPG-3-F | 7.5 |
| CPG-5-F | 7.5 |
| CCGU-3-F | 5 |
| PGU-2-F | 12 |
| PGU-3-F | 12 |
| PGU-5-F | 12 |
| CGPC-3-3 | 3 |
| CPPC-3-3 | 4 |
| CPPC-5-3 | 3 |
| CPPC-5-5 | 3 |
| PPG-TO-F | 6 |
| PPU-TO-F | 12 |
| CGU-3-F | 4 |

S → N [° C.]: <−20° C.
Clearing point [° C.]: +102.5° C.
$\Delta n$: +0.1923
$\Delta \epsilon$: +12.1
$V_0$ [V]: +1.14

Example K

| Component | [% by weight] |
|---|---|
| PGIGI-3-F | 9 |
| CPG-3-F | 5.5 |
| CPG-5-F | 10 |
| CCGU-3-F | 4.5 |
| PGU-2-F | 12 |
| PGU-3-F | 12 |
| PGU-5-F | 12 |
| CGPC-3-3 | 3 |
| CPPC-3-3 | 4 |
| CPPC-5-3 | 3 |
| CPPC-5-5 | 3 |
| PPG-TO-F | 6 |
| PPU-TO-F | 12 |
| CPU-3-F | 4 |

S → N [° C.]: <−20° C.
Clearing point [° C.]: +103.0° C.
$\Delta n$: +0.1926
$\Delta \epsilon$: +11.8
$V_0$ [V]: +1.16

Example L

| Component | [% by weight] |
|---|---|
| PGIGI-3-F | 7 |
| CPG-2-F | 6 |
| CPG-3-F | 6 |
| CPG-5-F | 8 |
| CCGU-3-F | 5 |
| CGU-3-F | 4 |
| PGU-2-F | 12 |
| PGU-3-F | 12 |
| PGU-5-F | 12 |
| CGPC-3-3 | 2 |
| CPPC-3-3 | 4 |
| CPPC-5-3 | 3 |
| CPPC-5-5 | 3 |
| PPG-TO-F | 6 |
| PPU-TO-F | 10 |

S → N [° C.]: <−20° C.
Clearing point [° C.]: +99.0° C.
$\Delta n$: +0.1869
$\Delta \epsilon$: +12.3
$V_0$ [V]: +1.10

Example M

| Component | [% by weight] |
|---|---|
| PGIGI-3-F | 10 |
| CPG-3-F | 8 |
| CPG-5-F | 8 |
| CCGU-3-F | 4 |
| PGU-2-F | 12 |
| PGU-3-F | 12 |
| PGU-5-F | 12 |
| CGPC-3-3 | 3 |
| CPPC-3-3 | 4 |
| CPPC-5-3 | 3 |
| CPPC-5-5 | 3 |
| PPG-TO-F | 6 |
| PPU-TO-F | 12 |
| CGU-3-F | 3 |

S → N [° C.]: <−20° C.
Clearing point [° C.]: +102.0° C.
$\Delta n$: +0.1929
$\Delta \epsilon$: +11.8
$V_0$ [V]: +1.17

COMPARATIVE EXAMPLE

| Component | [% by weight] |
|---|---|
| GGP-5-Cl | 16 |
| CPG-2-F | 11 |
| CPG-3-F | 11 |
| CPG-5-F | 6 |
| CGU-2-F | 9 |
| CGU-3-F | 9 |
| CGU-5-F | 8 |
| CPU-3-F | 8 |
| CCGU-3-F | 7 |
| CPP-3-2 | 10 |
| CPPC-3-3 | 3 |
| CPPC-5-3 | 2 |

S → N [° C.]: <−20° C.
Clearing point [° C.]: +102.0° C.
Δn: +0.1610
Δε: +10.9
$V_0$ [V]: +1.14

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosure[s] of all applications, patents and publications, cited herein and of corresponding German Patent Application No. 102 16 851.2, filed Apr. 16, 2002 is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. Liquid-crystalline medium comprising a) from 7 to 25% by weight of one or more compounds of the formula (I)

$$CF_3O\text{-a-b-c-}F \quad (I)$$

in which
a, b, c are each, independently of one another, selected from

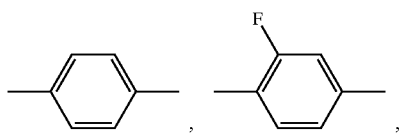

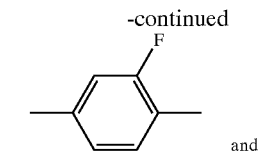
and c is additionally selected from

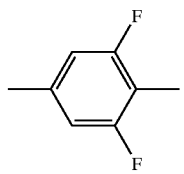 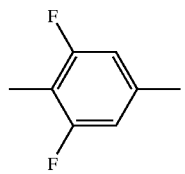
and , b) from 40 to 85% by weight of one or more compounds selected from those of the formulae (IIa) to (IIg) and (III) to (V)

R-P-G-U-X (IIa)

R-P-G-G-X (IIb)

R-G-G-G-X (IIc)

R-G-G-U-X (IId)

R-G-G-P-X (IIe)

R-G-P-G-X (IIf)

R-G-P-E-P-X (IIg)

in which

P is 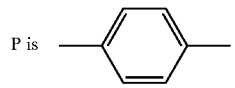

G is 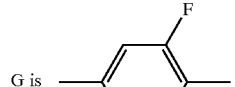

U is 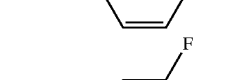, and

E is —$CH_2$—$CH_2$—

R is an alkyl, alkoxy or alkenyl radical having 1 to 15 carbon atoms or 2 to 15 carbon atoms, respectively, where one or more —$CH_2$— groups are optionally replaced by —O— in such a way that oxygen atoms are not adjacent, and X is —F, —$OCF_3$, —$OCF_2H$, —Cl and —$CF_3$, R-g-h-i-X (III)

in which g is

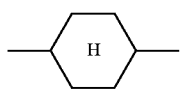

h is selected from

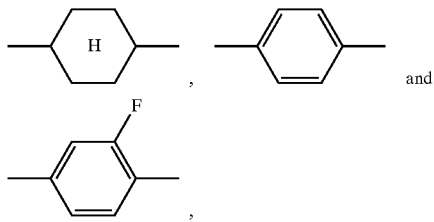

i is selected from

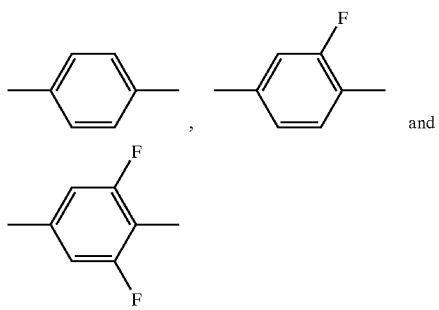

and X and R are as defined above,

R-h-i-X    (IV)

in which
h, i, R and X are as defined above,

R-k-l-m-n-X    (V)

in which
k is

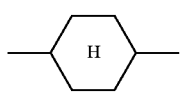

l is selected from

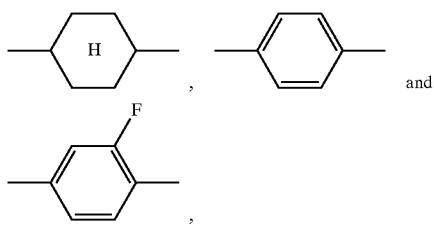

m, n are selected from

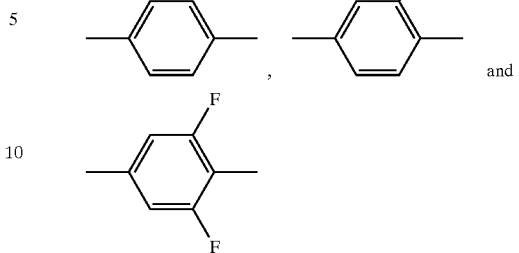

and R and X are as defined above, c) from 3 to 15% by weight of one or more compounds of the formula (VIa) to VIc)

R-P-GI-GI-F    (VIa)

R-P-GI-GI-Cl    (VIb)

R-P-G-P-R    (VIc)

in which

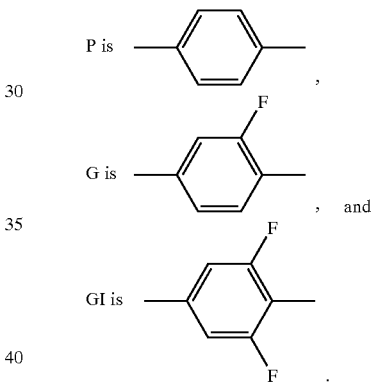

and,
R is as defined above, d) from 5 to 20% by weight of one or more compounds of the formula (VIIa) to (VIIf)

R-C-P-P-C-R    (VIIa)

R-C-G-P-C-R    (VIIb)

R-C-P-G-P-R    (VIIec)

R-C-P-GI-P-R    (VIId)

R-C-G-P-P-R    (VIIe)

R-C-GI-P-P-R    (VIIf)

in which

C is 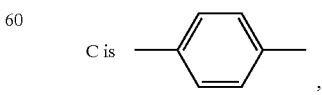

and
R, P, G and GI are independent of one another and are as defined above, e) from 0 to 10% by weight of one or more compounds of the formulae (VIII) and/or (IX)

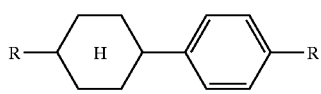     (VIII)

in which
R are independent of one another and are as defined above,

R-w-x-y-R$_2$     (IX)

in which
w, x is

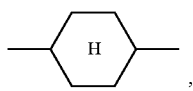

y is selected from

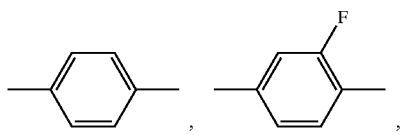

R is as defined above, and
R$^2$ is, in addition to the meanings of R, —F,
the sum of the components a) to e) being 100% by weight.

2. Liquid-crystalline medium according to claim 1, wherein the compounds of the formula (I) are selected from the following compounds of the formulae (Ia) to (Ih)

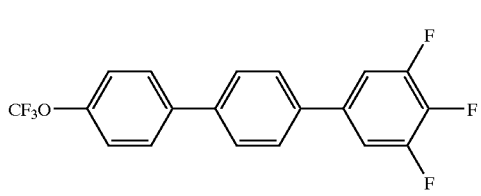     (Ia)

     (Ib)

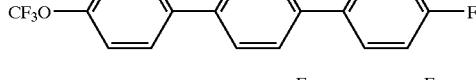     (Ic)

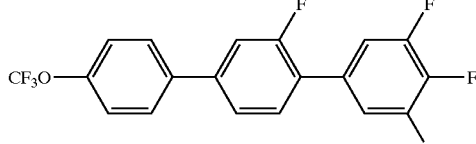     (Id)

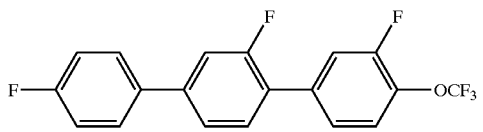     (Ie)

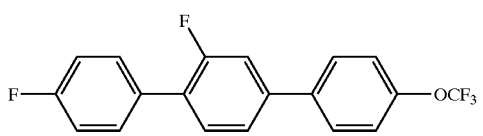     (If)

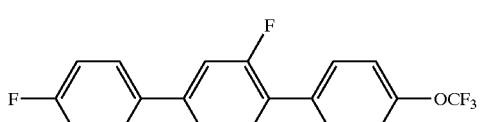     (Ig)

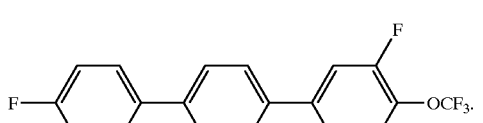     (Ih)

3. Liquid-crystalline medium according to claim 1, wherein the compounds of the formulae (III) to (V) are selected from the following compounds of the formulae (IIIa) to (IIIf), (IVa) to (IVf) and (Va) to (Vd)

| | |
|---|---|
| R-C-P-G-X | (IIIa) |
| R-C-P-U-X | (IIIb) |
| R-C-C-G-X | (IIIc) |
| R-C-C-U-X | (IIId) |
| R-C-G-U-X | (IIIe) |
| R-C-G-G-X | (IIIf) |
| R-G-U-X | (IVa) |
| R-G-G-X | (IVb) |
| R-P-U-X | (IVc) |
| R-C-P-X | (IVd) |
| R-C-G-X | (IVe) |
| R-C-U-X | (IVf) |
| R-C-C-P-U-X | (Va) |
| R-C-P-G-U-X | (Vb) |
| R-C-P-G-G-X | (Vc) |
| R-C-C-G-U-X | (Vd) | in which

C is 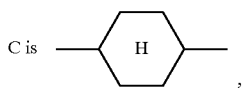

P is 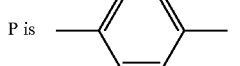

-continued

G is 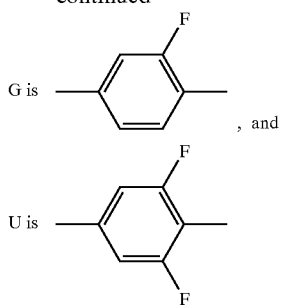, and

U is

R is an alkyl, alkoxy or alkenyl radical having 1 to 15 carbon atoms or 2 to 15 carbon atoms, respectively, where one or more —CH$_2$— groups are optionally replaced by —O— in such a way that oxygen atoms are not adjacent, and X is selected from —F, —OCF$_3$, —OCF$_2$H, —Cl and —CF$_3$.

4. Liquid-crystalline medium according to claim 1, wherein in the formulae (IIa) to (IIg) and (III) to (V)

R is an alkyl radical having 1 to 7 carbon atoms, and

X is —F.

5. Liquid-crystalline medium according to claim 3, wherein in the formulae (IIa) to (IIg) and (III) to (V)

R is an alkyl radical having 1 to 7 carbon atoms, and

X is —F.

6. Liquid-crystalline medium according to claim 1, wherein R in the formulae (VIa) to (VIc) and (VIIa) to (VIIf) is an alkyl radical having 1 to 7 carbon atoms.

7. Liquid-crystalline medium according to claim 1, comprising, as component b), b1) from 20 to 80% by weight of one or more compounds of the formula (IIa) to (IIg), and b2) from 80 to 20% by weight of one or more compounds of the formulae (III) to (V), the sum of the components b 1) and b2) being 100% by weight.

8. Electro-optical display element containing a liquid-crystalline medium according to claim 1.

9. Liquid-crystalline medium comprising a) from 3 to 50% by weight of one or more compounds of the formula (I)

CF$_3$O-a-b-c-F  (I)

in which a, b, c each denote, independently of one another,

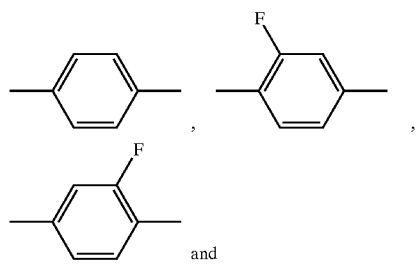

and c is additionally selected from

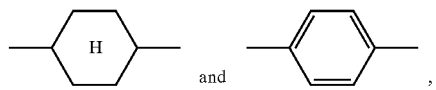

b) from 10 to 90% by weight of one or more compounds selected from those of the formulae (IIa) to (IIg) and (III) to (V)

formulae (IIa) to (IIg):

R-P-G-U-X  (IIa)

R-P-G-G-X  (IIb)

R-G-G-G-X  (IIc)

R-G-G-U-X  (IId)

R-G-G-P-X  (IIe)

R-G-P-G-X  (IIf)

R-G-P-E-P-X  (IIg)

in which

P is 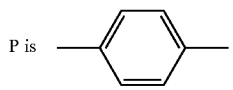

G is 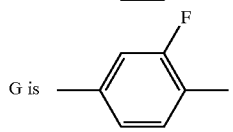

U is 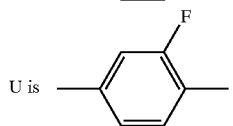, and

E is —CH$_2$—CH$_2$—,

R is selected from an alkyl, alkoxy or alkenyl radical having 1 to 15 carbon atoms or 2 to 15 carbon atoms, respectively, where one or more —CH$_2$— groups are optionally replaced by —O— in such a way that oxygen atoms are not adjacent, and X is selected from —F, —OCF$_3$, —OCF$_2$H, —Cl and —CF$_3$, R-g-h-i-X  (III)

in which g is

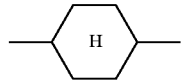

h is selected from

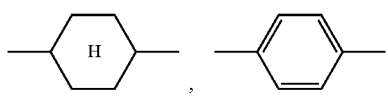

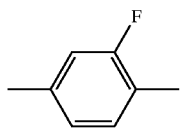

i is selected from

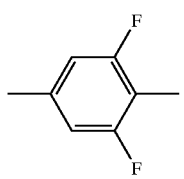

and X and R are as defined above,

R-h-i-X     (IV)

in which
h, i, R and X are as defined above,

R-k-l-m-n-X     (V)

in which
k is

l is selected from

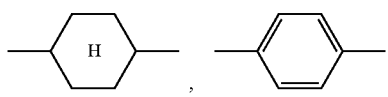

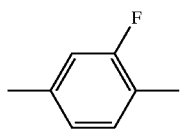

m, n are selected from

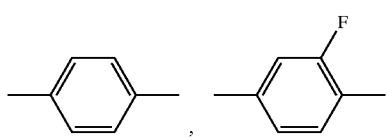

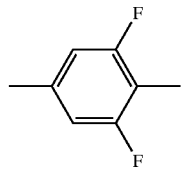

and R and X are as defined above, c) from 0 to 30% by weight of one or more compounds of the formulae (VIa) to (VIc):

R-P-GI-GI-F     (VIa)

R-P-GI-GI-Cl     (VIb)

R-P-G-P-R     (VIc)

in which
R are at each occurrence independent of one another and selected from an alkyl, alkoxy or alkenyl radical having 1 to 15 carbon atoms or 2 to 15 carbon atoms, respectively, where one or more —$CE_2$— groups are optionally replaced by —O— in such a way that oxygen atoms are not adjacent, and P is 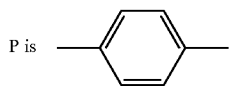

G is 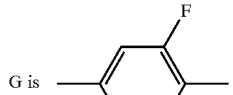, and

GI is 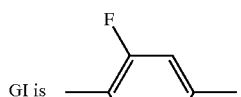.

d) from 0 to 30% by weight of one or more compounds of the formula and (VIIa) to (VIIf):

R-C-P-P-C-R     (VIIa)

R-C-G-P-C-R     (VIIb)

R-C-P-G-P-R     (VIIc)

R-C-P-GI-P-R     (VIId)

R-C-G-P-P-R     (VIIe)

R-C-GI-P-P-R     (VIIf)

in which

C is 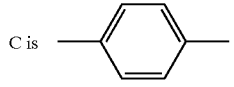, and
R, P, G, GI are independent of one another and are as defined above, e) from 0 to 30% by weight of one or more compounds of the formulae (VIII) and/or (IX)

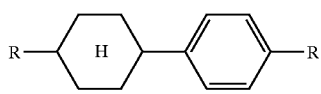
(VIII)

in which

R are independent of one another and are as defined above,

R-w-x-y-R²      (IX)

in which w,x is

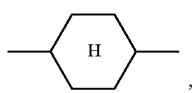

y is selected from

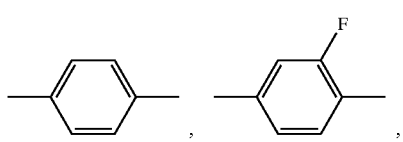

R is as defined above, and

R² is, in addition to the meanings of R, —F, the sum of the components a) to e) being 100% by weight.

10. Liquid-crystalline medium according to claim 9, wherein the compounds of the formula (I) are selected from the following compounds of the formulae (Ia) to (Ih)

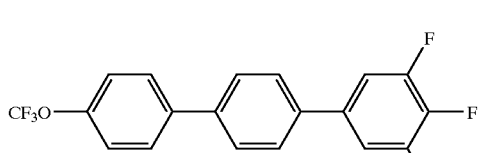
(Ia)

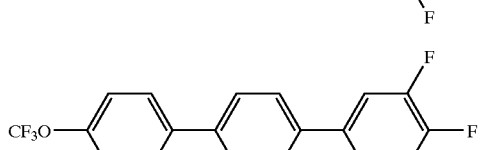
(Ib)

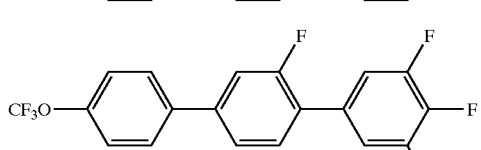
(Ic)

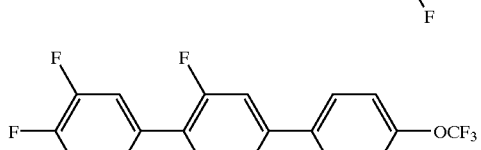
(Id)

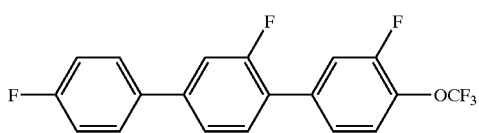
(Ie)

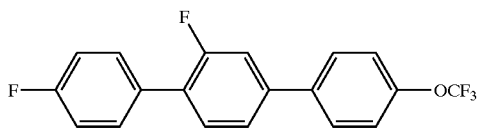
(If)

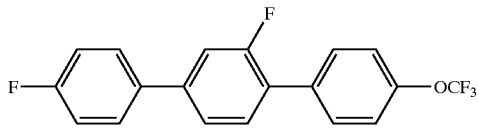
(Ig)

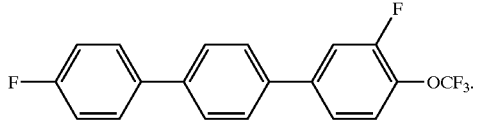
(Ih)

11. Liquid-crystalline medium according to claim 9, wherein the compounds of the formulae (III) to (V) are selected from the following compounds of the formulae (IIIa) to (IIIf), (IVa) to (IVf) and (Va) to (Vd)

| | |
|---|---|
| R-C-P-G-X | (IIIa) |
| R-C-P-U-X | (IIIb) |
| R-C-C-G-X | (IIIc) |
| R-C-C-U-X | (IIId) |
| R-C-G-U-X | (IIIe) |
| R-C-G-G-X | (IIIf) |
| R-G-U-X | (IVa) |
| R-G-G-X | (IVb) |
| R-P-U-X | (IVc) |
| R-C-P-X | (IVd) |
| R-C-G-X | (IVe) |
| R-C-U-X | (IVf) |
| R-C-C-P-U-X | (Va) |
| R-C-P-G-U-X | (Vb) |
| R-C-P-G-G-X | (Vc) |
| R-C-C-G-U-X | (Vd) | in which

C is 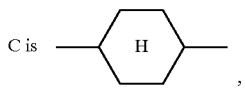,

P is 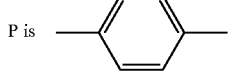,

G is 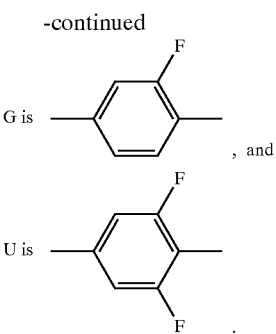, and

U is

R is an alkyl, alkoxy or alkenyl radical having 1 to 15 carbon atoms or 2 to 15 carbon atoms, respectively, where one or more —CH$_2$— groups are optionally replaced by —O— in such a way that oxygen atoms are not adjacent, and X is selected from —F, —OCF$_3$, —OCF$_2$H, —Cl and —CF$_3$.

12. Liquid-crystalline medium according to claim 9, wherein in the formulae (IIa) to (IIg) and (III) to (V)

R is an alkyl radical having 1 to 7 carbon atoms, and
X is —F.

13. Liquid-crystalline medium according to claim 11, wherein in the formulae (II) to (V)

R is an alkyl radical having 1 to 7 carbon atoms, and
X is —F.

14. Liquid-crystalline medium according to claim 9, wherein R in the formulae (VIa) to (VIc) and (VIIa) to (VIIf) is an alkyl radical having 1 to 7 carbon atoms.

15. Liquid-crystalline medium comprising:
a) one or more compounds of the formula (I)

CF$_3$O-a-b-c-F     (I)

in which
a, b, c each denote, independently of one another,

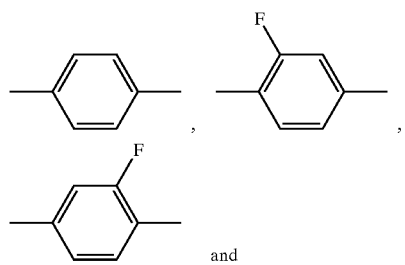

and c is additionally selected from

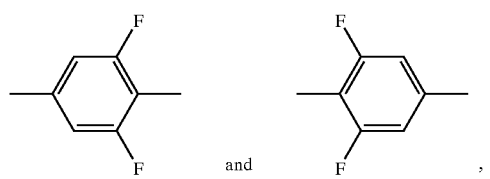

b) one or more compounds selected from those of the formulae (II) to (V)

R-d-e-Z-f-X     (II)

in which
d, e, f are each, independently of one another, selected from

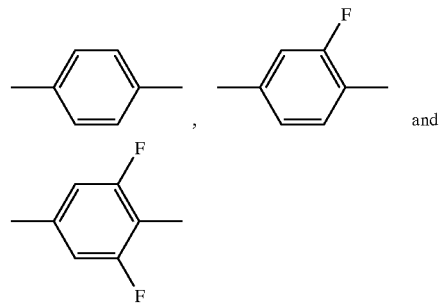

R is selected from an alkyl, alkoxy or alkenyl radical having 1 to 15 carbon atoms or 2 to 15 carbon atoms, respectively, where one or more —CH$_2$— groups are optionally replaced by —O— in such a way that oxygen atoms are not adjacent, X is selected from —F, —OCF$_3$, —OCF$_2$H, —Cl and —CF$_3$, and Z is selected from a single bond and —CH$_2$—CH$_2$—, R-g-h-i-X     (III)

in which
g is

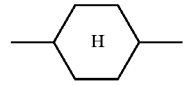

h is selected from

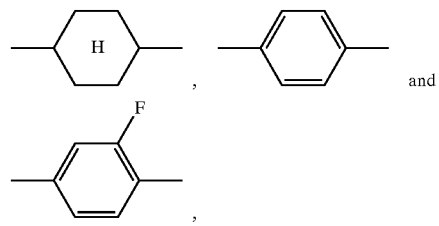

i is selected from

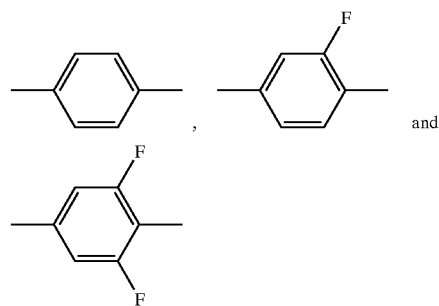

and X and R are as defined above,

R-h-i-X     (IV)

in which
h, i, R and X are as defined above,

R-k-l-m-n-X  (V)

in which
k is

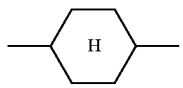

l is selected from

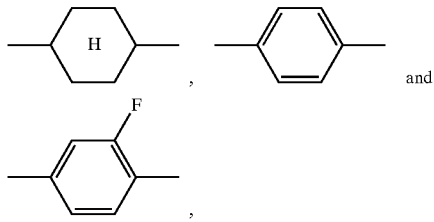
and m,n are selected from

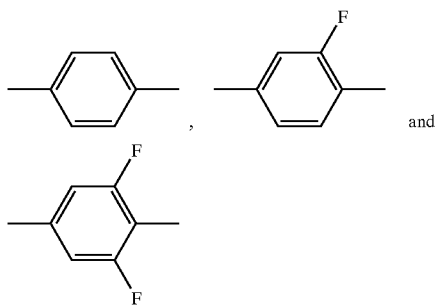
and and R and X are as defined above, c) one or more compounds of the formulae (VIa) to (VIc):

R-P-GI-GI-F  (VIa)

R-P-GI-GI-Cl  (VIb)

R-P-G-P-R  (VIc)

in which
R are at each occurrence independent of one another and selected from an alkyl, alkoxy or alkenyl radical having 1 to 15 carbon atoms or 2 to 15 carbon atoms, respectively, where one or more —CH$_2$— groups are optionally replaced by —O— in such a way that oxygen atoms are not adjacent, and P is 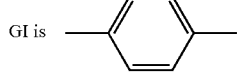, G is 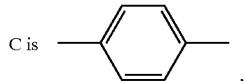, and GI is 

d) one or more compounds of the formula and (VIIa) to (VIIf):

R-C-P-P-C-R  (VIIa)

R-C-G-P-C-R  (VIIb)

R-C-P-G-P-R  (VIIc)

R-C-P-GI-P-R  (VIId)

R-C-G-P-P-R  (VIIe)

R-C-GI-P-P-R  (VIIf)

in which

C is 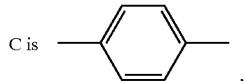, and
R, P, G, GI are independent of one another and are as defined above, e) one or more compounds of the formulae (VIII) and/or (IX)

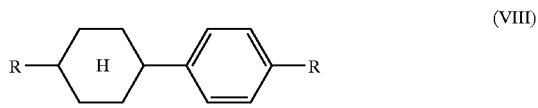  (VIII)

in which
R are independent of one another and are as defined above,

R-w-x-y-R$^2$  (IX)

in which
w,x is

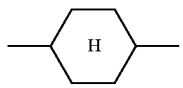, y is selected from

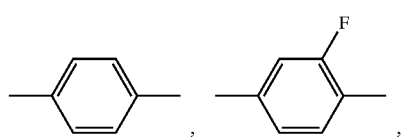

R is as defined above, and
R$^2$ is, in addition to the meanings of R, —F,
the sum of the components a) to e) being 100% by weight, wherein the composition contains:
a) from 7 to 25% by weight of one or more compounds of the formula (I), b) from 40 to 85% by weight of one or more compounds of the formulae (II) to (V),
c) from 3 to 15% by weight of one or more compounds of the formula (VIa) to (VIc),
d) from 5 to 20% by weight of one or more compounds of the formula (VIIa) to (Vhf),
e) from 0 to 10% by weight of one or more compounds of the formulae (VIII) and/or (IX),
the sum of the components a) to e) being 100% by weight.

16. Liquid-crystalline medium according to claim 15, comprising, as component b),
b1) from 20 to 80% by weight of one or more compounds of the formula (II), and
b2) from 80 to 20% by weight of one or more compounds of the formulae (III) to (V),
the sum of the components hi) and b2) being 100% by weight.

17. Electro-optical display element containing a liquid-crystalline medium according to claim 9.

18. Liquid-crystalline medium comprising
a) from 7 to 25% by weight of one or more compounds of the formula (I)

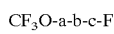  (I)

in which
a, b, c each denote, independently of one another,

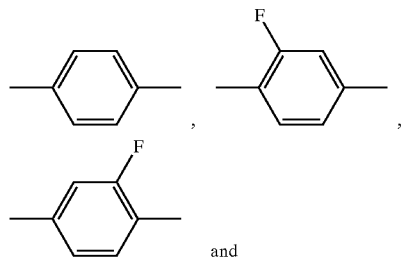

c is additionally selected from

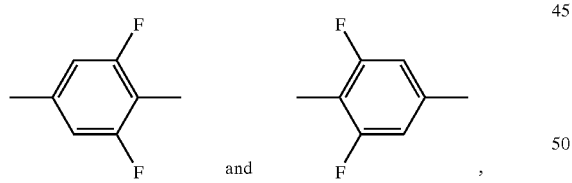

b) from 40 to 85% by weight of one or more compounds selected from those of the formulae (II) to (V)

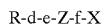  (II)

in which
d, e, f may each denote, independently of one another,

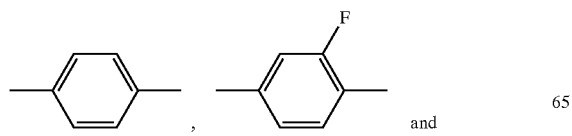

-continued

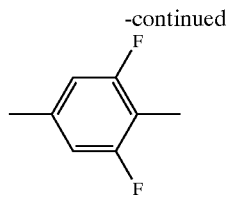

R is selected from an alkyl, alkoxy or alkenyl radical having 1 to 15 carbon atoms or 2 to 15 carbon atoms, respectively, where one or more —$CH_2$— groups are optionally replaced by —O— in such a way that oxygen atoms are not adjacent, X is selected from —F, —$OCF_3$, —$OCF_2H$, —Cl and —$CF_3$, and Z is selected from a single bond and —$CH_2$—$CH_2$—,

  (III)

in which
g is selected from

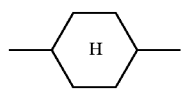

h is selected from

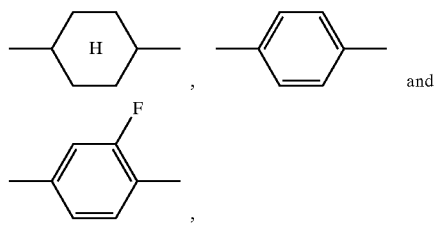

i is selected from

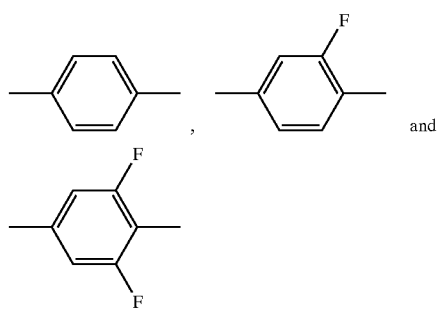

and X and R are as defined above,

  (IV)

in which
h, i, R and X are as defined above,

  (V)

in which k is

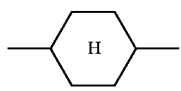

l is selected from

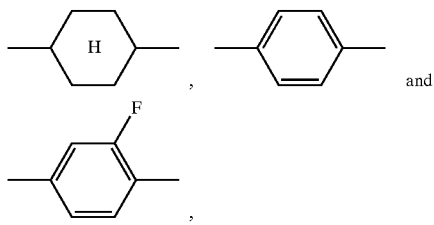

m, n are selected from

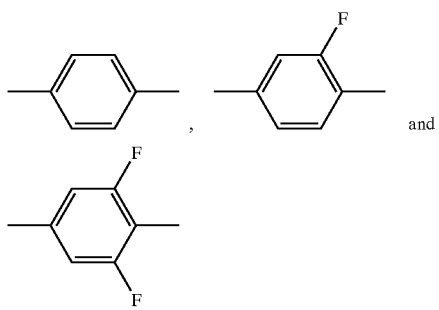

and R and X are as defined above, c) from 3 to 15% by weight of one or more compounds of the formula (VI)

R-p-q-r-R¹ (VI)

in which
p is

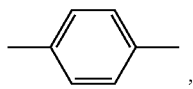

q, r are each, independently of one another, selected from

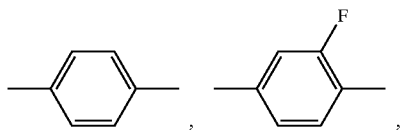

R is as defined above, and
R¹ is, in addition to the meanings of R, selected from —F and —Cl, d) from 5 to 20% by weight of one or more compounds of the formula (VII)

R-s-t-u-v-R (VII)

in which s is

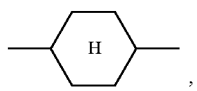

t, u is selected from

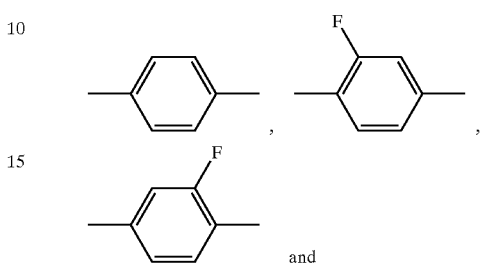

v is selected from

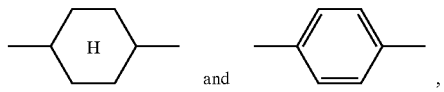

and
R are independent of one another and are as defined above, e) from 0 to 10% by weight of one or more compounds of the formulae (VIII) and/or (IX)

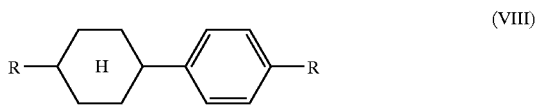
(VIII)

in which
R are independent of one another and are as defined above,

R-w-x-y-R² (IX)

in which
w,x is

y is selected from

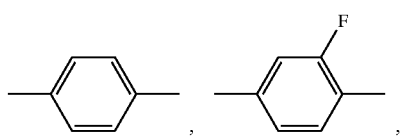

R is as defined above, and
R² is, in addition to the meanings of R, —F,
the sum of the components a) to e) being 100% by weight.

19. Liquid-crystalline medium according to claim 18, wherein the compounds of the formula (I) are selected from the following compounds of the formulae (Ia) to (Ih)

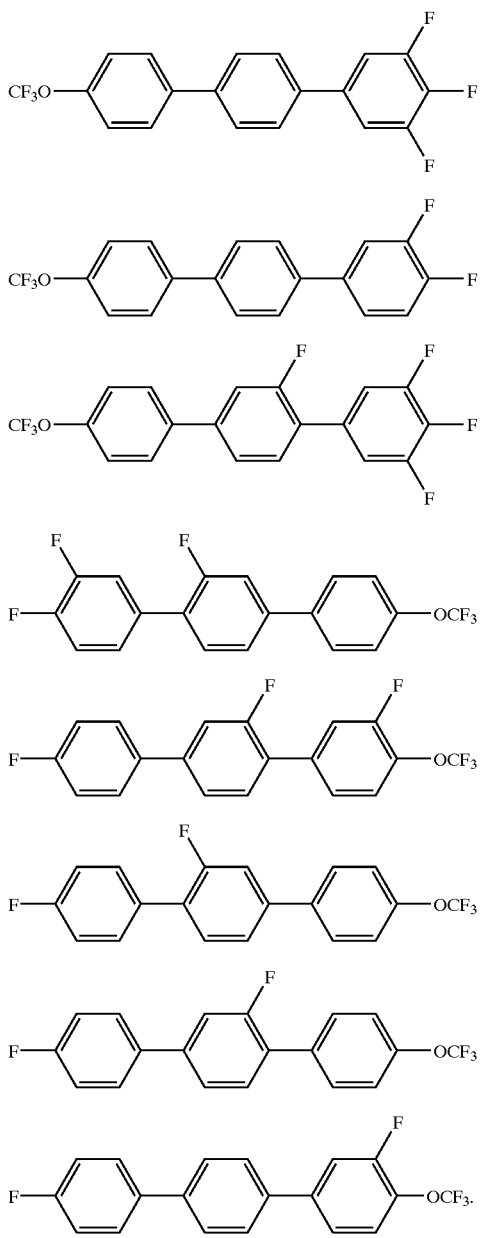

in which

P is 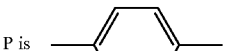

G is 

U is 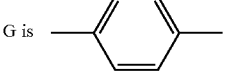 , and

E is —CH₂—CH₂— ,

R is an alkyl, alkoxy or alkenyl radical having 1 to 15 carbon atoms or 2 to 15 carbon atoms, respectively, where one or more —CH₂— groups are optionally replaced by —O— in such a way that oxygen atoms are not adjacent, and X is —F, —OCF₃, —OCF₂H, —Cl and —CF₃.

21. Liquid-crystalline medium according to claim 18, wherein the compounds of the formulae (III) to (V) are selected from the following compounds of the formulae (IIIa) to (IIIf), (IVa) to (IVf) and (Va) to (Vd):

| | |
|---|---|
| R-C-P-G-X | (IIIa) |
| R-C-P-U-X | (IIIb) |
| R-C-C-G-X | (IIIc) |
| R-C-C-U-X | (IIId) |
| R-C-G-U-X | (IIIe) |
| R-C-G-G-X | (IIIf) |
| R-G-U-X | (IVa) |
| R-G-G-X | (IVb) |
| R-P-U-X | (IVc) |
| R-C-P-X | (IVd) |
| R-C-G-X | (IVe) |
| R-C-U-X | (IVf) |
| R-C-C-P-U-X | (Va) |
| R-C-P-G-U-X | (Vb) |
| R-C-P-G-G-X | (Vc) |
| R-C-C-G-U-X | (Vd) | in which

C is 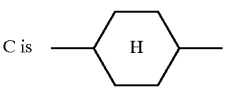 ,

20. Liquid-crystalline medium according to claim 18, wherein the compounds of the formula (II) are selected from the following compounds of the formulae (IIa) to (IIg):

| | |
|---|---|
| R-P-G-U-X | (IIa) |
| R-P-G-G-X | (IIb) |
| R-G-G-G-X | (IIc) |
| R-G-G-U-X | (IId) |
| R-G-G-P-X | (IIe) |
| R-G-P-G-X | (IIf) |
| R-G-P-E-P-X | (IIg) |

P is 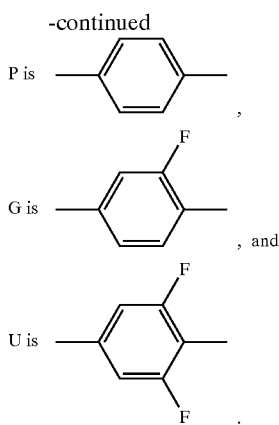,

G is (structure with F), and

U is (structure with F, F).

R is an alkyl, alkoxy or alkenyl radical having 1 to 15 carbon atoms or 2 to 15 carbon atoms, respectively, where one or more —CH$_2$— groups are optionally replaced by —O— in such a way that oxygen atoms are not adjacent, and X is selected from —F, —OCF$_3$, —OCF$_2$H, —Cl and —CF3.

22. Liquid-crystalline medium according to claim 18, wherein in the formulae (II) to (V)

R is an alkyl radical having 1 to 7 carbon atoms, and

X is —F.

23. Liquid-crystalline medium according to claim 21, wherein in the formulae (II) to (V)

R is an alkyl radical having 1 to 7 carbon atoms, and

X is —F.

24. Liquid-crystalline medium according to claim 18, wherein the compounds of the formulae (VI) and (VII) are selected from the following compounds of the formulae (VIa) to (VIc) and (VIIa) to (VIIf):

R-P-GI-GI-F (VIa)

R-P-GI-GI-Cl (VIb)

R-P-G-P-R (VIc)

R-C-P-P-C-R (VIIa)

R-C-G-P-C-R (VIIb)

R-C-P-G-P-R (VIIc)

R-C-P-GI-P-R (VIId)

R-C-G-P-P-R (VIIe)

R-C-GI-P-P-R (VIIf)

in which

R are at each occurrence independent of one another and selected from an alkyl, alkoxy or alkenyl radical having 1 to 15 carbon atoms or 2 to 15 carbon atoms, respectively, where one or more —CH$_2$— groups are optionally replaced by —O— in such a way that oxygen atoms are not adjacent, and C is (cyclohexane with H), P is , G is (with F), and GI is (with F, F).

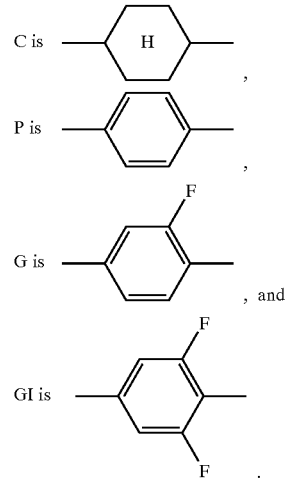

25. Liquid-crystalline medium according to claim 24, wherein R in the formulae (VIa) to (VIc) and (VIIa) to (VIIf) is an alkyl radical having 1 to 7 carbon atoms.

26. Liquid-crystalline medium according to claim 18, comprising, as component b), b1) from 20 to 80% by weight of one or more compounds of the formula (II), and b2) from 80 to 20% by weight of one or more compounds of the formulae (III) to (V), the sum of the components b1) and b2) being 100% by weight.

27. Electro-optical display element containing a liquid-crystalline medium according to claim 18.

* * * * *

UNITED STATES PATENT AND TRADEMARK OFFICE
CERTIFICATE OF CORRECTION

PATENT NO.       : 6,905,741 B2
APPLICATION NO. : 10/414495
DATED            : June 14, 2005
INVENTOR(S)      : Atsutaka Manabe et al.

It is certified that error appears in the above-identified patent and that said Letters Patent is hereby corrected as shown below:

Column 19, line 44, reads "R-k-I-m-n-X" should read -- R-k-l-m-n-X --
Column 20, line 51, reads "(VIIec)" should read -- (VIIc) --
Column 21, line 14, reads "R-w-x-y-R$_2$" should read -- R-w-x-y-R$^2$ --
Column 23, line 42, reads "components b 1)" should read -- components b1) --
Column 24, line 2, please change the formulas to the following:

--C is additionally selected from

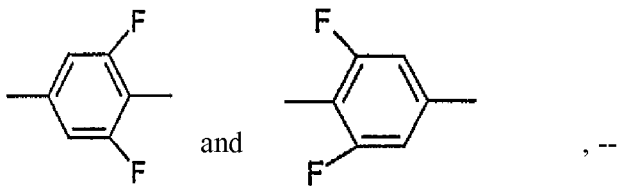

and                , --

Column 25, line 30, right justify "(VI)"
Column 25, line 36, reads "R-k-I-m-n-X" should read -- R-k-l-m-n-X --
Column 26, line 14, right justify "(VIa)"
Column 26, line 15, right justify "(VIb)"
Column 26, line 16, right justify "(Vic)"
Column 26, line 24, reads "-CE$_2$- groups arc" should read -- -CH$_2$- groups are --

Column 26, line 59, please change the formula to the following:

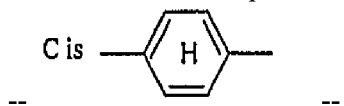

--                  --

Column 31, line 24, reads "m,n are selected" should read -- m, n are selected --
Column 32, line 25, please change the formula to the following:

--  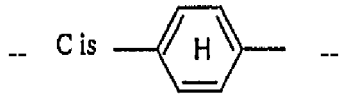  --

UNITED STATES PATENT AND TRADEMARK OFFICE
CERTIFICATE OF CORRECTION

PATENT NO. : 6,905,741 B2
APPLICATION NO. : 10/414495
DATED : June 14, 2005
INVENTOR(S) : Atsutaka Manabe et al.

It is certified that error appears in the above-identified patent and that said Letters Patent is hereby corrected as shown below:

Column 32, line 47, reads "w,x is" should read -- w, x is --
Column 33, line 6, reads "(Vhf)," should read -- (VIIf), --
Column 33, line 18, reads "hi)" should read -- b1) --
Column 34, line 65, reads "R-k-I-m-n-X" should read -- R-k-l-m-n-X --

Column 36, line 47, reads "w,x is" should read -- w, x is --
Column 39, line 40, right justify -- (VIa) --
Column 40, line 26, please change to the formula to the following:

-- GI is 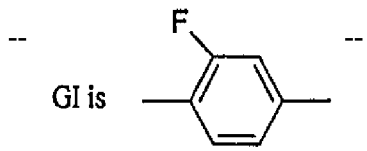 --

Signed and Sealed this

First Day of May, 2007

JON W. DUDAS
*Director of the United States Patent and Trademark Office*